(12) United States Patent
Burks (10) Patent No.: US 7,970,590 B1
(45) Date of Patent: Jun. 28, 2011

(54) PARAMETRIC TIMING ANALYSIS

(75) Inventor: Timothy M. Burks, Los Altos, CA (US)

(73) Assignee: Magma Design Automation, Inc., San Jose, CA (US)

( * ) Notice: Subject to any disclaimer, the term of this patent is extended or adjusted under 35 U.S.C. 154(b) by 685 days.

(21) Appl. No.: 12/035,898

(22) Filed: Feb. 22, 2008

Related U.S. Application Data (62) Division of application No. 11/048,287, filed on Jan. 31, 2005, now Pat. No. 7,346,874.

(60) Provisional application No. 60/540,932, filed on Jan. 30, 2004.

(51) Int. Cl.
*G06F 7/60* (2006.01)
(52) U.S. Cl. .......................................................... 703/2
(58) Field of Classification Search .................. None
See application file for complete search history.

(56) References Cited

U.S. PATENT DOCUMENTS

| | | | | |
|---|---|---|---|---|
| 6,088,523 | A * | 7/2000 | Nabors et al. | 703/14 |
| 6,463,570 | B1 * | 10/2002 | Dunn et al. | 716/4 |
| 2003/0188280 | A1 | 10/2003 | Lu | |
| 2004/0049746 | A1 * | 3/2004 | Rao et al. | 716/4 |
| 2004/0216062 | A1 | 10/2004 | Fan | |
| 2005/0086615 | A1 | 4/2005 | Anand et al. | |
| 2008/0243414 | A1 * | 10/2008 | Oh et al. | 702/85 |

OTHER PUBLICATIONS

Nowak, "Fitted Elmore Delay: A Simple and Accurate Interconnect Delay Model," *IEEE*, all pages (2002).
Gupta, "The Elmore Delay as a Bound for RC Trees with Generalized Input Signal," *IEEE*, all pp. 95-104 (1997).

* cited by examiner

*Primary Examiner* — David Silver
(74) *Attorney, Agent, or Firm* — Kilpatrick Townsend & Stockton LLP (57) ABSTRACT

Electronic Design Automation tools are used to aid in the design and verification of integrated circuits. As part of the verification process, circuit designs are analyzed with respect to their timing performance. Timing analysis is susceptible to variation in circuit components due to fabrication process variation. Process variation is introduced as worst-case conditions or statistical probabilities. More accurate process variation is modeled by for timing sensitivity with Parametric Elmore Delay. Parametric Elmore Delay introduces effects on circuit components as parameters in the conventional Elmore Delay definition to model fabrication process variation in the timing analysis. Delay variance demonstrates sensitivities to process and design factors. Parametric timing analysis is used to anticipate fabrication yield and identify potential improvements in the design or fabrication process.

15 Claims, 5 Drawing Sheets

PARAMETRIC TIMING ANALYSIS

CROSS-REFERENCES TO RELATED APPLICATIONS

This application is a divisional of U.S. patent application Ser. No. 11/048,287, filed Jan. 31, 2005, now patented as U.S. Pat. No. 7,346,874, which application claims priority from U.S. Provisional Application No. 60/540,932, filed Jan. 30, 2004, which are incorporated herein by reference in their entirety for all purposes.

BACKGROUND OF THE INVENTION

Today's large and complex digital integrated circuit ("IC") designs typically include millions of logic gates. As part of the design cycle, these designs have to be checked to ensure their proper function and that their performance requirements are met. The modeling, verification, and optimization process for checking these designs involves extensive timing analysis. Electronic design automation ("EDA") tools are use to automate and aid in speeding up this process.

One aspect affecting the timing analysis of IC designs is the effect of variation in circuit components induced by the normal variations in the fabrication process. The variation in process parameters needs to be taken into account in order to provide accurate timing modeling and subsequently high yielding manufactured components. EDA tools include techniques for modeling the typical process parameter variations of semiconductor fabrication processes. Conventionally, these techniques are based on "worst-case" conditions or statistical approximations.

The effect of process variation on timing performance is increasing as feature sizes shrink. As this effect increases, the current methodology for modeling, verification, and optimization of designs is encountering problems. Current EDA tools use static timing analysis techniques to verify proper operation at the desired speed and to find design elements that can be changed to fix problems or improve the performance of the circuit.

However, the current timing methodology fails to provide an accurate modeling of process variation because it is based on worst-case analysis. Worst-case analysis has several problems. Worst-case conditions can be overly pessimistic. Fabricated chips are often much faster than predicted. Worst-case conditions assume that everything goes wrong that possibly can. In reality, this is unlikely. In addition, given the many sources of variation, it is hard to provide an accurate model of the worst-case operating conditions. Variations can occur due to wire widths, thicknesses, transistor lengths, oxide thickness, temperature, and voltage. Moreover, the worst-case conditions can be path dependent. Depending on how they are routed on the various metal layers, different paths can have different sensitivities to wire width variation. For example, one path may have a tighter timing constraint when the metal on layer 2 is wide and the metal on layer 3 is narrow, while another's timing is tighter when the situation is reversed.

To address these problems, statistical timing analysis techniques have been proposed. Many of these techniques treat delays as independent random variables with known probability density functions ("pdf"). The pdfs for delays are used to obtain pdfs or related cumulative density functions ("cdf") for signal arrival times and slacks. These pdfs and/or cdfs are then used to calculate the probability that a particular slack value will be nonnegative.

However, existing methods for statistical timing analysis assume that delays are independent. In contrast to the worst-case timing analysis assumptions, this assumption can lead to significant optimism, which can result in greater yield impact due to process variation. Further, these statistical timing techniques do not demonstrate the relationship between yield and controlling factors, which makes yield improvement analysis more complicated.

Thus, what is needed is a method for modeling process parameters in circuit timing analysis that (1) provides a more realistic process variation estimation, (2) helps identify process parameters that should be controlled more closely to increase yield of a particular design, and (3) helps identify changes that can be made to a design to increase fabrication yield.

BRIEF SUMMARY OF THE INVENTION

In accordance with one illustrative embodiment of the present invention, it is provided a method for expressing signal propagation delay as a function of a set of parameters and a method for combining these delays into expressions of timing slack as a function of those same parameters, which provide a more accurate model of process variation. In addition, given estimates of the statistical characteristics of those parameters, the statistical characteristics of slack is calculated to identify process parameters and design changes that can be modified to increase yield.

In one embodiment, a method for modeling the variation of fabrication process parameters for the analysis of circuit timing of a resistance/capacitance ("RC") circuit includes several steps. In this embodiment, the timing analysis is performed in an electronic design automation ("EDA") tool for integrated circuit design.

According to this embodiment, the method includes receiving the values for the resistance variation parameters characteristic of the fabrication process that will be used to manufacture the circuit. These variation values are associated with resistors in the circuit, for example, based on which layer of the fabrication process the resistor will be on, e.g., metal 1, metal 2, or the like. Similarly, the method includes receiving values for the capacitance variation parameters characteristic of the fabrication process. As with the resistive elements, the capacitance variation parameter values are associated capacitors in the circuit. These values are used to calculate the sum of the product of each resistance in each path of the circuit multiplied by an associated resistance variation component. The resistance variation component is a mathematical term that includes the associated resistance variation parameter value. In addition, each resistance is multiplied by the downstream capacitance in the resistor's path. Each capacitance is also multiplied by an associated capacitance variation component. The capacitance variation component similarly includes the associated capacitance variation parameter value. In this embodiment, the method also includes calculating a circuit delay value based on the calculated sum of RC products.

According to an alternative embodiment, a method for modeling the effects of fabrication parameter variations in the signal timing analysis of a resistance/capacitance (RC) circuit is based on Elmore-Delay-based calculation of delay variance. In this embodiment, the method is intended for an electronic design automation tool for integrated circuit design.

According to this embodiment, the method includes receiving the values for the resistance variation parameter characteristic of a fabrication process. The resistance variation parameter includes one value for each layer or set of layers of the fabrication process that affect the resistance values of circuit elements. Similarly, the method includes receiving the values for the capacitance variation parameter characteristic of the fabrication process. Each value is also associated with the layer or set of layers of the fabrication process that affects the capacitance of elements in the circuit.

Further, the method includes composing a square matrix (T) of Elmore-Delay-based products of resistance multiplied by sums of downstream capacitances for each path associated with each resistor of the circuit. The square matrix T has as many rows and columns as there are values in the resistance and capacitance variation parameters. Accordingly, each column includes the Elmore-Delay-based products corresponding to resistors in the layer or sets of layers associated with each resistance variation parameter value. Similarly, each row includes the sums of downstream capacitances associated with capacitors in the layer or sets of layers associated with each capacitance variation parameter value. According to this embodiment, the circuit delay variance is calculated based on the matrix T and the resistance and capacitance variation parameter values.

In yet another embodiment, an automated method for analyzing timing in an integrated circuit design is based upon an electronic circuit description that includes descriptions of resistive and capacitive elements. In this embodiment, the method includes selecting at least one path of the circuit described in the circuit design. Then, for each resistive element in the selected path, the method includes computing a resistive/capacitive (RC) product by multiplying the resistance of the resistive element by a sum of capacitances of the capacitive elements in a section of the path downstream from the resistive element. The method also includes selecting a resistive process variation parameter and a capacitive process variation parameter characteristic of a fabrication process associated with the circuit design. Then, computing the path delay sensitivity to process variation based on first-order sensitivities to process variation. The first-order sensitivities include variances of the resistive and capacitive process variation parameters and the RC products.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Electronic Design Automation ("EDA") software for aiding in the design of integrated circuits, including analyzing circuit timing, operates on conventional computers, e.g., personal computers, workstations, servers, or the like. For example, common EDA environments for integrated circuit ("IC") design include networks with one or more servers for processing the analysis, either individually or in distributed form, and workstations for users to interact with the tool. The techniques described herein for performing computations with respect to IC timing analysis are capable of being coded for computer execution in any computer language, e.g., C, C++, or the like. The techniques described herein can be implemented as a computer program, as part of a larger software application, or as features in an EDA tool environment for IC design, such as for example, the suite of Blast™ software products by Magma Design Automation, of Santa Clara, Calif.

One embodiment of the present invention includes EDA software for timing analysis in which timing characteristics of a circuit design are expressed as a function of the variable parameters associated with the semiconductor fabrication process. The variations of those parameters are used to calculate the amount of timing variation. According to this embodiment timing delays are expressed parametrically using a Parametric Elmore Delay ("PED").

Elmore Delay Overview

Figure 1:
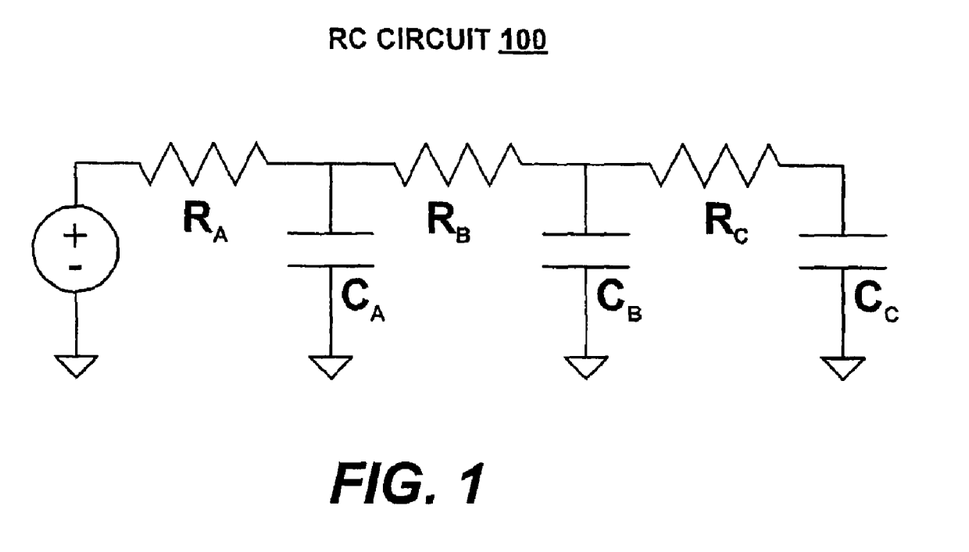
FIG. 1 is a circuit diagram for a conventional resistance/capacitance ("RC") circuit.

The conventional Elmore Delay is an easy-to-compute estimate of the delay of a path through a linear circuit. For a resistance/capacitance ("RC") circuit, it is the sum of the product of each resistance, R, in the path multiplied by its downstream capacitance, C. For example, referring to FIG. 1, a conventional RC circuit is shown. For this circuit, the Elmore Delay ("D") is calculated as follows:

$$D=R_A[C_A+C_B+C_C]+R_B[C_B+C_C]+R_C[C_C]$$

Parametric Elmore Delay

Resistance and capacitance of the elements in an IC are dependent on fabrication process variations. To model the effect of process variation on resistance and capacitance, each resistance, R, is assumed to vary by a parameter $\alpha_i$ and each capacitance, C, is assumed to vary by a parameter $\beta_j$. With these assumptions and by way of example, the Elmore Delay, D, of the circuit shown in FIG. 1 with the parametric variation of R and C is expressed as follows:

$$D=R_A(1+\alpha_1)[C_A(1+\beta_1)+C_B(1+\beta_2)+C_C(1+\beta_3)]+R_B(1+\alpha_2)[C_B(1+\beta_2)+C_C(1+\beta_3)]+R_C(1+\alpha_3)[C_C(1+\beta_3)]$$

In a more general sense, according to one embodiment, the parametric Elmore Delay D equation is given by the following expression:

$$D = \sum_{i,j} \tau_{i,j} \cdot [(1 + \alpha_i)(1 + \beta_j)]$$

In this equation, each $\tau_{i,j}$ is a sum of resistance-capacitance products. The RC products can be arranged into a matrix T, where T is defined to be the Parametric Elmore Delay. Accordingly, the Parametic Elmore Delay can be expressed in matrix form as follows:

$$D=(1+\alpha)^T T(1+\beta)$$

Multiplying this matrix equation into individual terms, provides the following expression for the Parametric Elmore Delay:

$$D = 1^T T 1 + \alpha^T T 1 + 1^T T \beta + \alpha^T T \beta$$

The first term is the sum of all rows and columns of the RC matrix, T, and corresponds to the conventional Elmore Delay. The 2nd and 3rd terms are the first-order sensitivities to resistance and capacitance variations, which are typically given by the particular fabrication process. The 4th term contains second-order sensitivities, which in a typical fabrication process are neglected because resistance and capacitance variations are small. For the sample circuit of FIG. 1, the Parametric Elmore Delay RC product matrix (T) is given by the following expression:

$$T = \begin{bmatrix} R_A C_A & R_A C_B & R_A C_C \\ 0 & R_B C_B & R_B C_C \\ 0 & 0 & R_C C_C \end{bmatrix}$$

With this Parametric Elmore Delay ("PED") definition, the effects of a process variation on circuit resistive and capacitive elements is more accurately modeled in the timing analysis performed by EDA tools. The resistance and capacitance variation parameters ($\alpha_i$ and $\beta_j$) are characteristic of each fabrication process. It should be noted that these variation parameters are derived from fabrication process data by techniques that are beyond the scope of this patent. For example, resistance and capacitance variation for each metal layer of a process can be directly measured on sets of fabricated wafers, either through process characterization, process control, or the like. For purposes of the present embodiment, the process variation parameters are received as input. In one embodiment, EDA tools use the PED timing technique described herein by receiving the R and C variation parameters as input and using them to model their effect on timing delay analysis and to provide a more accurate result than conventional worst-case or statistical techniques.

Further, in one embodiment, the resistance (R) and capacitance (C) variation parameters are further correlated based on their relationship to other process and design factors. For example, resistances and capacitances are grouped into classes that vary together based on particular metal layers, physical regions on a chip, or line width ("w") and thickness ("d") of the metal interconnects used in the design or process.

By way of example, in one embodiment the PED calculation with RC line width based correlation takes into account their relationship. As the line width increases, R decreases and C increases. Accordingly, in one embodiment, the correlation of RC and w/d can be taken into account by expressing the correlated PED as a function of the process parameters and the w/d relationship.

Computing Parametric Elmore Delay

Figure 2:
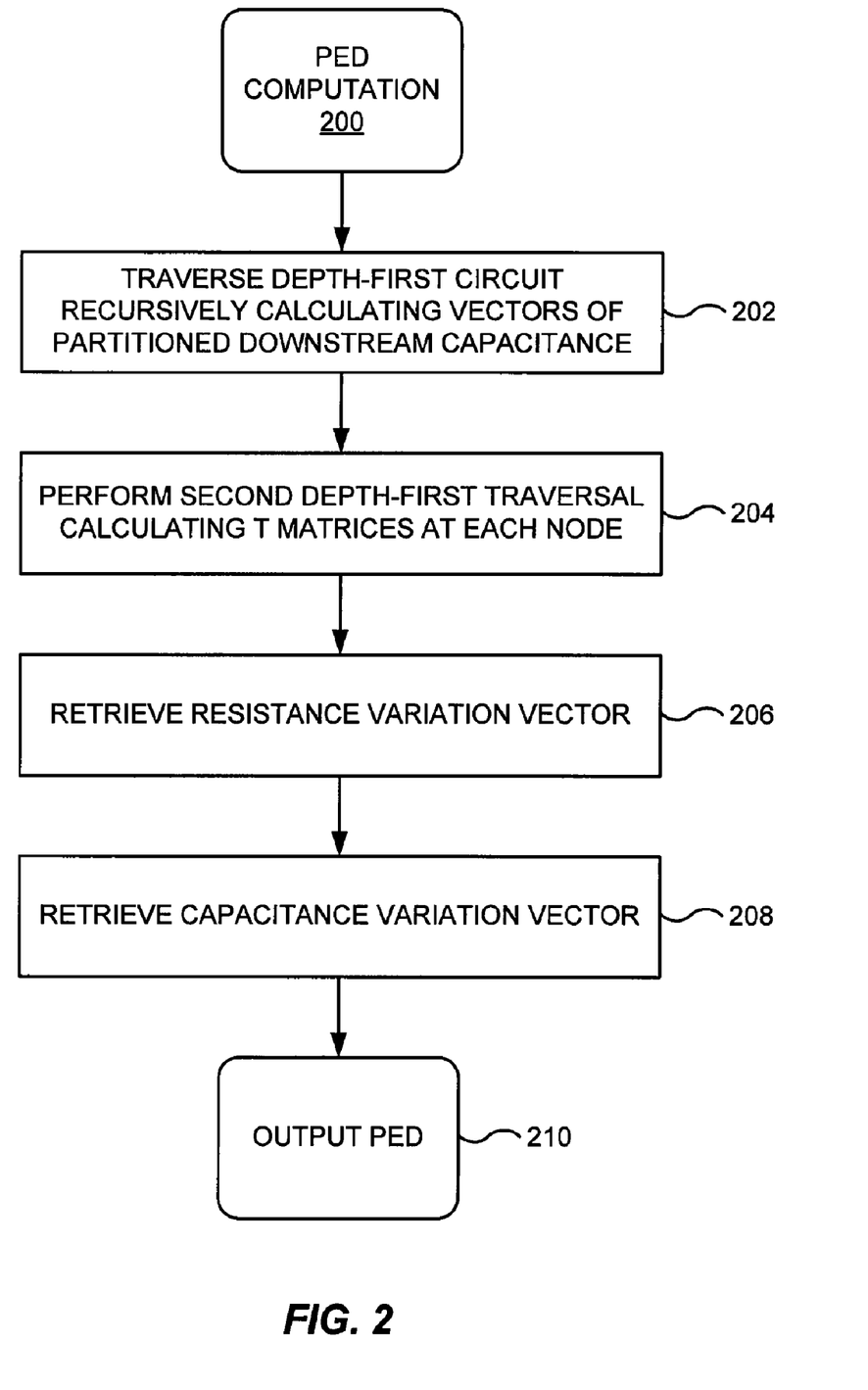
FIG. 2 is a block diagram for a sample embodiment of a method for computing Parametric Elmore Delay.
Figure 3A:
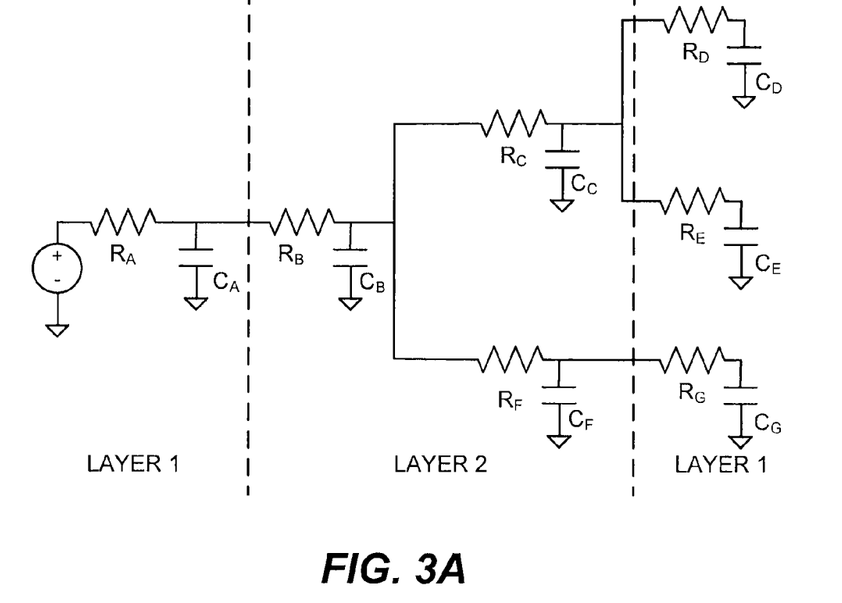
FIG. 3A is a circuit diagram for a sample embodiment of a tree structured RC network.

Now referring to FIG. 2, a block diagram for a sample embodiment of a method for computing Parametric Elmore Delay is shown. In this embodiment, IC designs are assumed to be of tree structured RC networks and the analysis is based on RICE [See Ratzlaff, C. L.,. Gopal, N., Pillage, L. T., "RICE: rapid interconnect circuit evaluator",. . Design Automation Conference, 1991. p. 555-560, the relevant contents of which are incorporated by reference]. A sample embodiment of a tree structured RC network is shown in FIG. 3A. In this embodiment, resistances $R_i$ and capacitances $C_j$ correspond to two different metal layers, layer 1 and layer 2, of a semiconductor fabrication process whose resistances $R_i$ and capacitances $C_j$ vary separately (note that with respect to FIGS. 3A and 3B, i and j=A–G).

Two metal layers are used by way of example and for simplicity of description but in practice any number of metal layers can be used with this approach.

It should be noted that in a conventional EDA tool, circuit designs are represented by electronic descriptions of the circuit elements, e.g., based on a cell library or the like, that are used by the computer software to model the actual circuit to be fabricated. For purposes of this description, when reference is made to a circuit element, it should be understood to refer to its electronic representation used by the software.

Figure 3B:
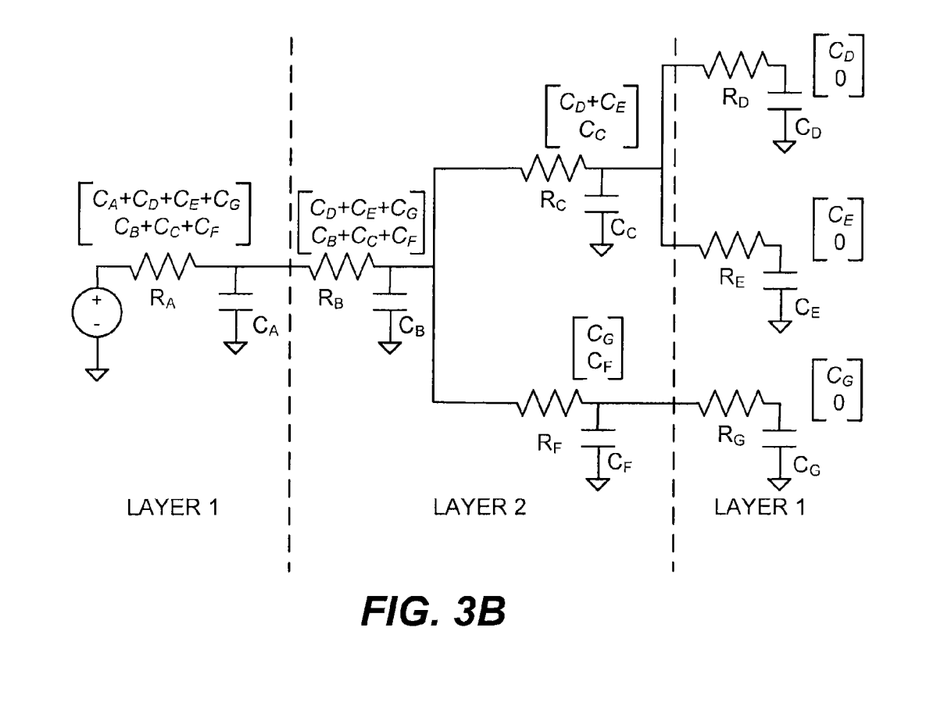
FIG. 3B is a circuit diagram for one example of the RC vectors at each resistive node Ri for the sample circuit of FIG. 3A.

Referring back to FIG. 2, in this embodiment, the PED calculation 200 includes four steps. Initially, a depth-first traversal of the circuit design is performed 202 to recursively calculate vectors of partitioned downstream capacitance (C= [$\Sigma C_i$]) at each resistive node. For each resistive element in a given path, the vector of downstream capacitances for each ith layer is determined. FIG. 3B shows one example of the RC vectors at each resistive node $R_i$ for the sample circuit of FIG. 3A.

Next, a second depth-first traversal is performed 204 to calculate T matrices at each node, for example, by adding $R_i C$ into the ith column of each $T_i$ matrix. The result is the PEDs to each node in the RC network. By way of example, for the circuit shown in FIG. 3A, the node-wise Parametric Elmore Delays are:

$$T_A = \begin{bmatrix} R_A(C_A + C_D + C_E + C_G) & 0 \\ R_A(C_B + C_C + C_F) & 0 \end{bmatrix}$$

$$T_B = \begin{bmatrix} R_A(C_A + C_D + C_E + C_G) & R_B(C_D + C_E + C_G) \\ R_A(C_B + C_C + C_F) & R_B(C_B + C_C + C_F) \end{bmatrix}$$

$$T_C = \begin{bmatrix} R_A(C_A + C_D + C_E + C_G) & R_B(C_D + C_E + C_G) + R_C(C_D + C_E) \\ R_A(C_B + C_C + C_F) & R_B(C_B + C_C + C_F) + R_C C_C \end{bmatrix}$$

$$T_D = \begin{bmatrix} R_A(C_A + C_D + C_E + C_G)R_D C_D & R_B(C_D + C_E + C_G) + R_C(C_D + C_E) \\ R_A(C_B + C_C + C_F) & R_B(C_B + C_C + C_F)R_C C_C \end{bmatrix}$$

$$T_E = \begin{bmatrix} R_A(C_A + C_D + C_E + C_G) + R_E C_E & R_B(C_D + C_E + C_G) + R_C(C_D + C_E) \\ R_A(C_B + C_C + C_F) & R_B(C_B + C_C + C_F) + R_C C_C \end{bmatrix}$$

$$T_F = \begin{bmatrix} R_A(C_A + C_D + C_E + C_G) & R_B(C_D + C_E + C_G) + R_F C_F \\ R_A(C_B + C_C + C_F) & R_B(C_B + C_C + C_F) + R_F C_G \end{bmatrix}$$

-continued
$$T_G = \begin{bmatrix} R_A(C_A + C_D + C_E + C_G) + R_G C_G & R_B(C_D + C_E + C_G) + R_F C_F \\ R_A(C_B + C_C + C_F) & R_B(C_B + C_C + C_F)R_F C_G \end{bmatrix}$$

Sources of resistance variation due to process parameters are introduced 206 as vectors of random variables with one dimension per layer. Similarly, sources of capacitance variation are introduced 208. For the example above, resistance and capacitance variation is modeled with column vectors of random variables $\alpha$ and $\beta$:

$$\alpha = \begin{bmatrix} \alpha_1 \\ \alpha_2 \end{bmatrix} \text{ and } \beta = \begin{bmatrix} \beta_1 \\ \beta_2 \end{bmatrix}$$

As mentioned above, the variation values of parameters $\alpha$ and $\beta$ are input to the software for the Parametric Elmore Delay computation of this embodiment. Using these parametric variation vectors, a node-wise PED calculation ($D_i$) is given as a result 210 by applying the matrix equation to the above $T_i$ matrices (for i=A, B, G corresponding to each node):

$$D_i = 1^T T_i 1 + \alpha^{T_i} T_i 1 + 1^{T_i} T_i \beta + \alpha^{T_i} T_i \beta$$

It should be noted that in some embodiments, Elmore Delays do not provide sufficient accuracy for determination of the actual delays of RC circuits. More accurate calculation methods are commonly available but are not easily partitioned parametrically. However, for analysis of variance in the timing of paths in the circuit design, Elmore Delays are sufficiently accurate to identify sensitivities to the process and design variables. In general, to further improve accuracy of the mean value of the Parametric Elmore Delay, it can be scaled so that its nominal value matches the more accurate calculation.

Accordingly, in one embodiment, the Parametric Elmore Delay is used in an EDA tool for modeling timing variance due to variation in fabrication process parameters. As described above, the 2nd and 3rd terms of the PED equation are the first-order sensitivities to resistance and capacitance variations, which are typically given by the particular fabrication process. Using these terms, the variance ("var") of the PED can be approximated as follows:

$$\text{var}(D) \approx \text{var}(\alpha)^T (T1)^2 + (1^T T)^2 \text{var}(\beta)$$

Parametric Timing Analysis using the Parametric Elmore Delay

Figure 4:
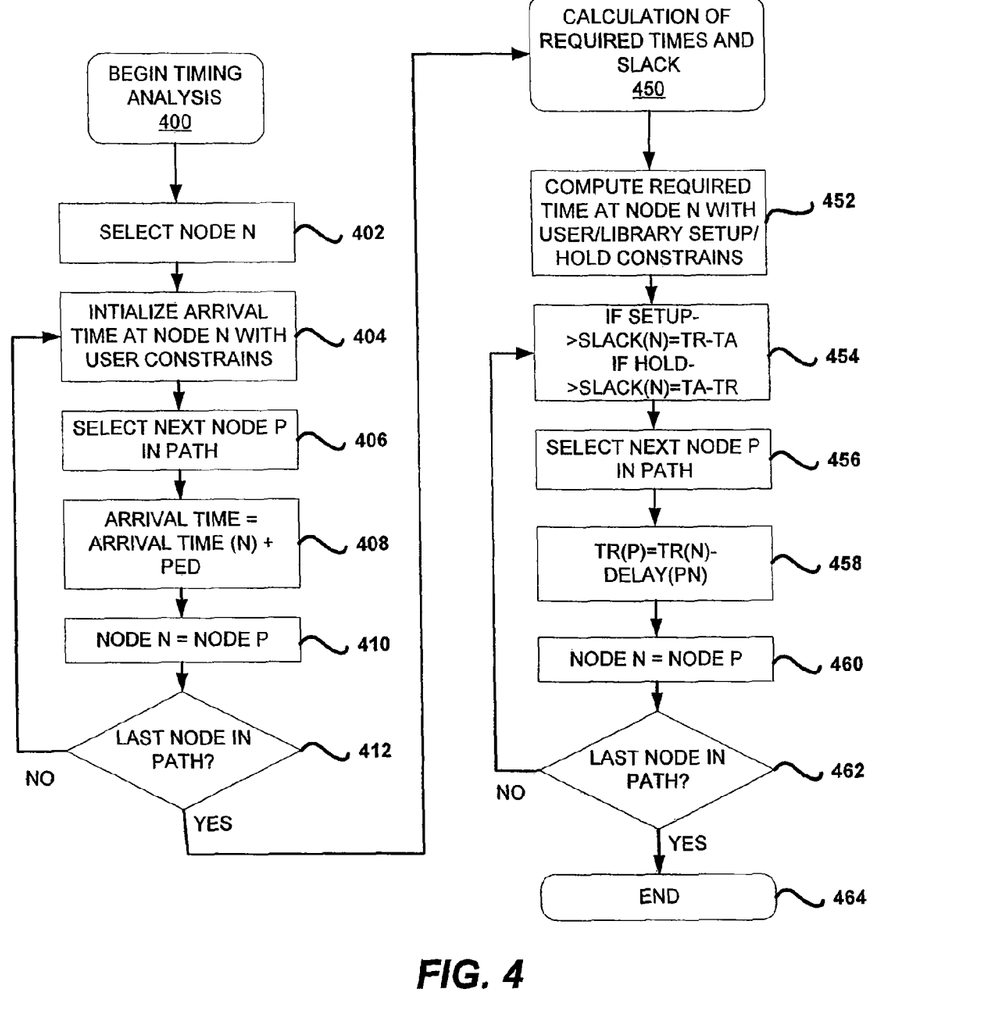
FIG. 4 is a flow chart for one embodiment of a method to analyze circuit node timing using Parametric Elmore Delay ("PED") in an Electronic Design Automation ("EDA") tool.

FIG. 4 shows one embodiment of a method to analyze circuit node timing using PED in a EDA tool. In this embodiment PED along each path of a circuit are summed up to calculate parametric arrival times ("TA") and then using parametric required times ("TR") the slack is calculated as the difference between arrival and required times.

To compute 400 the arrival times along a path, a first node N along the path is selected 402. The arrival time TA at that node N is initialized 404 using user-specified timing constraints for the particular circuit, which are input to the EDA tool. The next node P along the same path of the circuit is then selected 406. The arrival time TA at this node P is calculated 408 as the sum of the TA at node N and the PED from node N to node P. The process is iterated by setting 410 node N to node P and if the last node has not been reached 412 repeating the process to calculate arrival times TAs for each desired node in the path.

Once the path arrival times TA have been calculated, the required times TR and corresponding slack are calculated 450. The last node in the circuit path was set 412 to node N. For this node N, the required time TR is computed 452. To compute the required time TR user-specified or EDA tool library constraints are used. These constraints can be set-up time or hold time based constraints for the particular circuit design. Depending on the type of constraints used, the slack for node N is calculated 454 as the difference between required and arrival times, TR-TA for set-up time constraints or TA-TR for hold time constraints. The next node P up the path is then selected 456. The required time TR for this node P is calculated 458 as the TR of node N minus the PED from node N to node P. Node N is then set 460 to node P and if there are more nodes along this path 462, the TR and slack calculation is repeated.

When slack and TR for all the nodes in the path has been calculated the timing analysis for the path is completed 464. In a typical multi-path design, the process is repeated for every path to be analyzed. Based on this technique, parametric delay values are derived for every node and every path in a circuit design. In one embodiment, these node-wise parametric delays are used to help identify process parameters and design changes that have the greatest effect on the performance and potential yield of the design as further described below.

Figure 5:
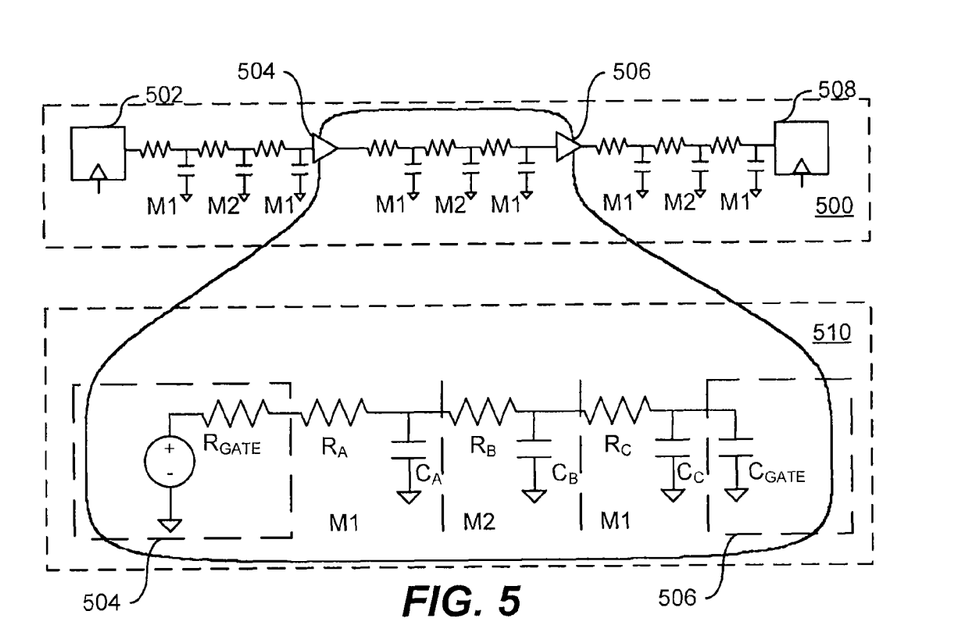
FIG. 5 is a circuit diagram for a three-stage circuit design for a two metal layer process.

For example, referring now to FIG. 5, in one embodiment, a three-stage circuit design for a two metal layer process is shown. Each stage consists of an electrically identical route first on metal layer 1 ("M1"), then on metal layer 2 ("M2"), then concluding back on M1. By way of example, the second stage, between device 504 and device 506 is shown in more detail as circuit 510.

The Parametric Elmore Delay of each stage is given by the following matrix:

$$T = \begin{bmatrix} R_{GATE} C_{GATE} & R_A C_{GATE} + R_C C_{GATE} & R_B C_{GATE} \\ R_{GATE}(C_A + C_C) & R_A(C_A + C_C) + R_C C_C & R_B C_C \\ R_{GATE} C_B & R_A C_B & R_B C_B \end{bmatrix}$$

Sample RC values are provided below for each resistance and capacitance in each stage:
$R_{GATE}$=1 kΩ  $C_{GATE}$=10 fF
$R_A$=1 kΩ  $C_A$=10 fF
$R_B$=10 kΩ  $C_B$=100 fF
$R_C$=1 kΩ  $C_C$=10 fF The Elmore delay for each stage is 2*130+10*120+1*20=260+1200+20=1480 pico seconds ("ps"). The PED for each stage with the sample values given above is expressed by the following matrix:

$$T_D = \begin{bmatrix} 10 & 20 & 100 \\ 20 & 30 & 100 \\ 100 & 100 & 1000 \end{bmatrix}$$

The sum of all rows and columns is 1480 ps, the Elmore Delay. Adding the delays along the path gives a total path delay between device 502 and device 508 for a total of:

$$T_{PATH} = 3T_D = \begin{bmatrix} 30 & 60 & 300 \\ 60 & 90 & 300 \\ 300 & 300 & 1000 \end{bmatrix} ps$$

If the arrival time TA at the beginning of the path is zero, the arrival time TA at the end of the path is $T_{PATH}$. As shown above, the total path PED ($D_{PATH}$) can be written as:

$$D_{PATH} = 1^T T_{PATH} 1 + \alpha^T T_{PATH} 1 + 1^T T_{PATH} \beta + \alpha^T T_{PATH} \beta$$

In one sample embodiment, gate resistances and input capacitances for a fabrication process vary with a variance of 10% and the resistances and capacitances on each metal layer vary with a variance of 20%. The process RC variances are expressed in vector matrix form as:

$$Mean(\alpha) = 0 \quad Mean(\beta) = 0$$

$$Var(\alpha) = \begin{bmatrix} 0.1 \\ 0.2 \\ 0.2 \end{bmatrix} \quad Var(\beta) = \begin{bmatrix} 0.1 \\ 0.2 \\ 0.2 \end{bmatrix}$$

The mean value of the path delay is given by the Elmore Delay, that is the first term in the PED equation. For the example shown in FIG. 5 the mean path Delay is shown below:

$$Mean(D_{PATH}) = 1^T T_{PATH} 1 = 4440 \text{ ps}$$

In one embodiment, the RC variation ($\alpha$ and $\beta$) are assumed to be independent. Thus, as shown above, the variance of path PED can be written in terms of the variance of these independent variables:

$$Var(D) \cong Var(\alpha)^T (T_{PATH} 1)^2 + (1^T T_{PATH})^2 Var(\beta)$$

Applying to this expression the values given for the sample circuit of FIG. 5, the variance for the path PED is calculated as follows:

$$Var(D_{PATH}) \cong [0.1 \ 0.2 \ 0.2] \left( \begin{bmatrix} 30 & 60 & 300 \\ 60 & 90 & 300 \\ 300 & 300 & 3000 \end{bmatrix} \begin{bmatrix} 1 \\ 1 \\ 1 \end{bmatrix} \right)^2 +$$

$$\left( [1 \ 1 \ 1] \begin{bmatrix} 30 & 60 & 300 \\ 60 & 90 & 300 \\ 300 & 300 & 3000 \end{bmatrix} \right)^2 \begin{bmatrix} 0.1 \\ 0.2 \\ 0.2 \end{bmatrix}$$

$$Var(D_{PATH}) \cong [0.1 \ 0.2 \ 0.2] \begin{bmatrix} 390 \\ 450 \\ 3600 \end{bmatrix}^2 + ([390 \ 450 \ 3600])^2 \begin{bmatrix} 0.1 \\ 0.2 \\ 0.2 \end{bmatrix}$$

$$Var(D_{PATH}) \cong [0.1 \ 0.2 \ 0.2] \begin{bmatrix} 152100 \\ 202500 \\ 12960000 \end{bmatrix} + [152100 \ 202500 \ 12960000] \begin{bmatrix} 0.1 \\ 0.2 \\ 0.2 \end{bmatrix}$$

$$Var(D_{PATH}) \cong 5295420 \ ps^2$$

$$Stdev(D_{PATH}) \cong 2301 ps$$

Using the method described above to calculate slack, the delays along the path are added to obtain the signal arrival time at the end of the path. For purposes of this example the arrival time TA at the beginning of the path is assumed to be zero. Accordingly, the arrival time TA at the end of the path is represented as $D_{PATH}$. This arrival time TA is subtracted from the required time TR at the end of the path (508) to obtain the slack for the path. For example, assuming the final required time TR for the sample circuit shown in FIG. 5 is 5 ns (5000 ps), the path slack is given by the following equation:

$$S_{PATH} = (5000 - D_{PATH}) \text{ps}$$

The mean value for the path slack is calculated based on the mean $D_{PATH}$ (as shown above=4440 ps) as follows:

$$\text{Mean}(S_{PATH}) = (5000 - \text{Mean}(D_{PATH})) = 5000 - 4440 = 560 \text{ ps}$$

and it has approximately the same standard deviation ("stdev") as the path delay calculated above:

$$\text{Stdev}(S_{PATH}) \cong 2301 \text{ ps}$$

Calculating Slack Distributions

In one embodiment, path slack follows a normal distribution. Therefore, its properties are calculated from its mean and standard deviation. For the example above, the standard deviation is much larger than the mean, so there is a significant likelihood that the path slack will be negative. According to this embodiment, the probability density function (pdf) of the normally distributed slack values is shown in FIG. 6, with a mean of $\mu = 560$ ps and standard deviation of $\sigma = 2301$ ps.

Figure 6:
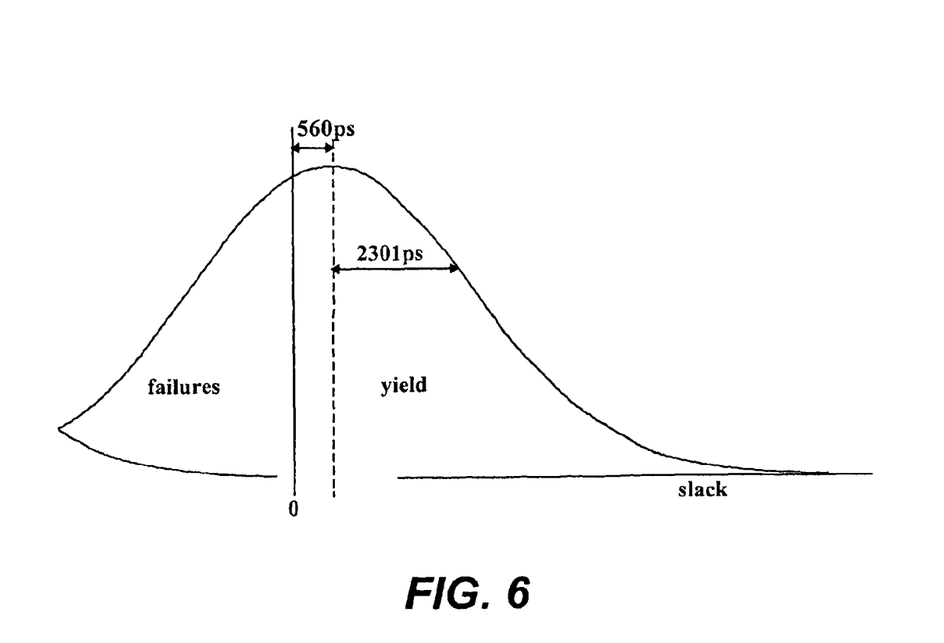
FIG. 6 is a chart for the probability density function ("pdf") of the normally distributed slack values.

The likelihood that an instance of the circuit associated with the distribution chart of FIG. 6 will meet its timing constraint when fabricated is the probability that the slack will be greater than or equal to zero. This is the area under the pdf curve to the right of the y-axis in FIG. 6. It can be calculated from standard statistical tables by normalizing the value (for X=0) as follows:

$$Z = \frac{(X - \mu)}{\sigma} = \frac{0 - 560}{2301} = -0.24$$

The area under the curve to the left of Z is read from a standard statistical normal distribution table to obtain a value of 0.42. This value corresponds to a projected process yield for this path of 0.58. Hence, the IC represented by this path is anticipated to function correctly for approximately 58% of the manufactured parts.

Statistical Issues for Block vs. Path-Based Analysis

Block based analysis is difficult because each path has a different PAT. Pruning is possible if parameter variations are known and a yield threshold is specified. However, it may be necessary to prune by parametric slack.

Identifying Parameters for Process Improvement

Parametric slack shows the sensitivity of timing to process parameters. Accordingly, in one embodiment it is used by EDA tools to identify areas where process control can improve yield and performance of the circuit design.

For example, with respect to the circuit shown in FIG. 5, if Metal 1 variation is reduced from 20% to 10%, the standard deviation of path slack is reduced slightly to 2292 ps and the yield remains at 58%. However, if Metal 2 variation is reduced by the same amount (from 20% to 10%), the slack standard deviation is reduced to 1644 ps and the yield increases to 62%. Thus, the PED timing analysis technique described above identifies that for this design a tighter process control for fabrication of the metal 2 layer would significantly improve the process yield.

Reprioritizing Paths Based on Process Yield

The worst-yielding path is not necessarily the path with the worst slack. Slack distributions may be used to calculate the yield of each endpoint and reprioritize endpoints based on their yield. For example, another path in the same design has a mean slack of 400 ps with a standard deviation of 600 ps. Although it has less slack, its yield is 74%, meaning it is more likely that the original path will have timing problems than that this one will.

Reducing Variation

A wire routed on a single layer will vary more than a similar wire routed on two layers. If a wire is equally divided across layers, each having similar variation n, the wire's variation will be $1/\sqrt{n}$ of its variation if it had been routed on only one layer. Therefore, to reduce variation n in a wire, we can spread it across multiple layers. Because this adds via resistance and reduces reliability, it is better to distribute this sensitivity along a path.

According to one embodiment, parametric slack is used to identify excessive sensitivities to particular parameters and to reroute wires to reduce their variation. For example, PED based slack is used to reassign the wire of one stage in the example to use metal 1 only. To do this, the PED of the stage is given by the following equation:

$$T'_D = \begin{bmatrix} R_{GATE} C_{GATE} & (R_A + R_B + R_C) & 0 \\ R_{GATE}(C_A + C_B + C_C) & R_A(C_A + C_B + C_C) + R_B(C_B + C_C) + R_C C_C & 0 \\ 0 & 0 & 0 \end{bmatrix}$$

For purposes of this example we assume that the resistance and capacitance values remain the same as those provided above. Using these values, the PED for the metal 1 only stage becomes:

$$T'_D = \begin{bmatrix} 10 & 120 & 0 \\ 120 & 1230 & 0 \\ 0 & 0 & 0 \end{bmatrix} ps$$

To determine the PED for the new path, the delays for the other two stages are added to provide the following results:

$$T'_{PATH} = 2T_D + T'_D = 2\begin{bmatrix} 10 & 20 & 100 \\ 20 & 30 & 100 \\ 100 & 100 & 1000 \end{bmatrix} + \begin{bmatrix} 10 & 120 & 0 \\ 120 & 1230 & 0 \\ 0 & 0 & 0 \end{bmatrix} = \begin{bmatrix} 30 & 160 & 200 \\ 160 & 1290 & 200 \\ 200 & 200 & 2000 \end{bmatrix} ps$$

Since the actual resistance and capacitance values have not changed, the mean value of the path delay is unchanged, 4440 ps, and the mean value of path slack remains 560 ps. However, as shown below, its standard deviation is reduced to 1850 ps, which increases the process yield to 62%.

$$Var(D'_{PATH}) \cong [\,0.1\quad 0.2\quad 0.2\,]\left(\begin{bmatrix}30 & 160 & 200\\160 & 1290 & 200\\200 & 200 & 2000\end{bmatrix}\begin{bmatrix}1\\1\\1\end{bmatrix}\right)^2 +$$

$$\left([\,1\quad 1\quad 1\,]\begin{bmatrix}30 & 160 & 200\\160 & 1290 & 200\\200 & 200 & 2000\end{bmatrix}\right)^2\begin{bmatrix}0.1\\0.2\\0.2\end{bmatrix}$$

$$Var(D'_{PATH}) \cong [\,0.1\quad 0.2\quad 0.2\,]\begin{bmatrix}390\\1650\\2400\end{bmatrix}^2 + ([\,390\quad 1650\quad 2400\,])^2\begin{bmatrix}0.1\\0.2\\0.2\end{bmatrix}$$

$$Var(D'_{PATH}) \cong [\,0.1\quad 0.2\quad 0.2\,]\begin{bmatrix}152100\\2722500\\5760000\end{bmatrix} + [\,152100\quad 2722500\quad 5760000\,]\begin{bmatrix}0.1\\0.2\\0.2\end{bmatrix}$$

$$Var(D'_{PATH}) \cong 3423420\,ps^2$$

$$Stdev(D'_{PATH}) \cong 1850\,ps$$

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for modeling fabrication process parameter variation for circuit timing analysis of a resistance/capacitance ("RC") circuit in an electronic design automation tool for integrated circuit design, the method comprising:
   receiving, at one or more computer systems hosting the electronic design automation tool, a plurality of resistance variation parameter values characteristic of variation in resistance values associated with the RC circuit due to a fabrication process, each resistance variation parameter value associated with at least one resistor of the RC circuit;
   receiving, at the one or more computer systems, a plurality of capacitance variation parameter values characteristic of variation in capacitance values associated with the RC circuit due to the fabrication process, each capacitance variation parameter value associated with at least one capacitor of the RC circuit;
   calculating, with one or more processors associated with the one or more computer systems, a sum of products,
   wherein each product in the sum of products includes a resistance value multiplied by an associated resistance variation component multiplied by a downstream capacitance multiplied by an associated capacitance variation component,
   wherein the resistance value includes a resistance for each resistor in each path of the RC circuit,
   wherein the associated resistance variation component includes for each resistor a resistance variation parameter value associated with the resistor,
   wherein the downstream capacitance is associated with capacitors between each resistor and a ground, and
   wherein the associated capacitance variation component includes the capacitance variation parameter value associated with each of the capacitors between each resistor and ground;
   determining, with the one or more processors associated with the one or more computer systems, a circuit delay value based on the calculated sum of products; and
   storing formation associated with the circuit delay value in a storage device associated with the one or more computer systems.

2. The method of claim 1, wherein the resistance variation parameter values and the capacitance variation parameter values correspond to metal layers of the fabrication process.

3. The method of claim 1, wherein determining the circuit delay value comprises determining a timing delay variance associated with fabrication process parameter variations.

4. The method of claim 1, wherein the resistance variation parameter values and the capacitance variation parameter values are correlated based on a width of metal interconnects in the RC circuit.

5. The method of claim 1, wherein the resistance variation parameter values and the capacitance variation parameter values are correlated based on a thickness of metal interconnects in the RC circuit.

6. A computer program product stored on a non-transitory computer readable medium for modeling fabrication process parameter variation for circuit timing analysis of a resistance/capacitance ("RC") circuit in an electronic design automation tool for integrated circuit design, the computer program product comprising:
   code for receiving a plurality of resistance variation parameter values characteristic of variation in resistance values associated with the RC circuit due to a fabrication process, each resistance variation parameter value associated with at least one resistor of the RC circuit;
   code for receiving a plurality of capacitance variation parameter values characteristic of variation in capacitance values associated with the RC circuit due to the fabrication process, each capacitance variation parameter value associated with at least one capacitor of the RC circuit;
   code for calculating a sum of products,
   wherein each product in the sum of products includes a resistance value multiplied by an associated resistance variation component multiplied by a downstream capacitance multiplied by an associated capacitance variation component,
   wherein the resistance value includes a resistance for each resistor in each path of the RC circuit, wherein the associated resistance variation component includes for each resistor a resistance variation parameter value associated with the resistor, wherein the downstream capacitance is associated with capacitors between each resistor and a ground, and wherein the associated capacitance variation component includes the capacitance variation parameter value associated with each of the capacitors between resistor and ground; and code for determining a circuit delay value based on the calculated sum of products.

7. The computer program product of claim 6, wherein the resistance variation parameter values and the capacitance variation parameter values correspond to metal layers of the fabrication process.

8. The computer program product of claim 6, wherein the code for determining the circuit delay value comprises code for determining a timing delay variance associated with fabrication process parameter variations.

9. The computer program product of claim 6, wherein the resistance variation parameter values and the capacitance variation parameter values are correlated based on a width of metal interconnects in the RC circuit.

10. The computer program product of claim 6, wherein the resistance variation parameter values and the capacitance variation parameter values are correlated based on a thickness of metal interconnects in the RC circuit.

11. A system for modeling fabrication process parameter variation for circuit timing analysis of a resistance/capacitance ("RC") circuit in an electronic design automation tool for integrated circuit design, the system comprising:

a processor; and a memory coupled to the processor, the memory configured to store a set of instructions which when executed by the processor cause the processor to:

receive a plurality of resistance variation parameter values characteristic of variation in resistance values associated with the RC circuit due to a fabrication process, each resistance variation parameter value associated with at least one resistor of the RC circuit;

receive a plurality of capacitance variation parameter values characteristic of variation in capacitance values associated with the RC circuit due to the fabrication process, each capacitance variation parameter value associated with at least one capacitor of the RC circuit;

calculate a sum of products, wherein each product in the sum of products includes a resistance value multiplied by an associated resistance variation component multiplied by a downstream capacitance multiplied by an associated capacitance variation component, wherein the resistance value includes a resistance for each resistor in each path of the RC circuit, wherein the associated resistance variation component for each resistor a resistance variation parameter value associated with the resistor, wherein the downstream capacitance is associated with capacitors between each resistor and a ground, and wherein the associated capacitance variation component includes the capacitance variation parameter value associated with each of the capacitors between resistor and ground; and determine a circuit delay value d on the calculated sum of products.

12. The system of claim 11, wherein the resistance variation parameter values and the capacitance variation parameter values correspond to metal layers of the fabrication process.

13. The system of claim 11, wherein the processor is caused to determine a timing delay variance associated with fabrication process parameter variations.

14. The system of claim 11, wherein the resistance variation parameter values and the capacitance variation parameter values are correlated based on a width of metal interconnects in the RC circuit.

15. The system of claim 11, wherein the resistance variation parameter values and the capacitance variation parameter values are correlated based on a thickness of metal interconnects in the RC circuit.

* * * * *